US008514080B2

(12) United States Patent
Gravelle et al.

(10) Patent No.: US 8,514,080 B2
(45) Date of Patent: *Aug. 20, 2013

(54) RFID TAG WITH OCCUPANCY STATUS RECALL

(75) Inventors: Kelly Gravelle, Poway, CA (US); Charles A. Johnson, Albuquerque, NM (US); Matthew K. Burnett, Albuquerque, NM (US); Dale L. Scott, Albuquerque, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 301 days.

This patent is subject to a terminal disclaimer.

(21) Appl. No.: 12/915,739

(22) Filed: Oct. 29, 2010

(65) Prior Publication Data

US 2011/0102156 A1 May 5, 2011

Related U.S. Application Data

(63) Continuation-in-part of application No. 12/533,067, filed on Jul. 31, 2009, now Pat. No. 8,344,886.

(60) Provisional application No. 61/085,338, filed on Jul. 31, 2008, provisional application No. 61/256,273, filed on Oct. 29, 2009.

(51) Int. Cl.
*G08B 13/14* (2006.01)

(52) U.S. Cl.
USPC ............... 340/572.1; 340/539.13; 340/435

(58) Field of Classification Search
USPC ............ 340/572.1–572.9, 539.1, 539.13, 340/539.26, 10.1, 988, 435, 5.61–5.67
See application file for complete search history.

(56) References Cited

U.S. PATENT DOCUMENTS

| | | | | |
|---|---|---|---|---|
| 5,809,142 | A | * | 9/1998 | Hurta et al. ............. 705/68 |
| 5,920,057 | A | | 7/1999 | Sonderegger et al. |
| 6,980,101 | B2 | | 12/2005 | Kelley |
| 7,016,311 | B2 | | 3/2006 | Tiernay et al. |
| 7,091,880 | B2 | | 8/2006 | Sorensen |
| 7,224,291 | B2 | * | 5/2007 | Hassett ................. 340/928 |
| 7,388,501 | B2 | | 6/2008 | Tang et al. |
| 7,450,010 | B1 | | 11/2008 | Gravelle et al. |
| 7,548,153 | B2 | | 6/2009 | Gravelle et al. |
| 7,782,206 | B2 | | 8/2010 | Burnett et al. |
| 7,990,286 | B2 | * | 8/2011 | Shankwitz et al. ......... 340/988 |
| 8,013,760 | B2 | | 9/2011 | Turnock et al. |
| 8,055,534 | B2 | | 11/2011 | Ashby et al. |
| 8,135,614 | B2 | * | 3/2012 | Allen et al. ............. 705/13 |
| 2003/0001755 | A1 | * | 1/2003 | Tiernay et al. ............ 340/928 |

(Continued)

*Primary Examiner* — Daniel Previl

(74) *Attorney, Agent, or Firm* — Caesar, Rivise, Bernstein, Cohen & Pokotilow, Ltd.

(57) ABSTRACT

An RFID tag for use in a vehicle for use in an electronic toll collecting system. The tag is capable of transmitting data to a tag interrogator indicating the occupancy status of the vehicle. In an embodiment, the tag has a user input and a visual and audible tag status indicator. The user input is used to change the occupancy status of the tag, wherein the occupancy status is a portion of a message sent by radio frequency to the interrogator when the vehicle passes through a toll area. In an embodiment the tag has memory for storage of said tag status and the user input can be used to cause the tag to indicate a stored tag status. In a further embodiment, the tag reverts to a default status after a predetermined period of time.

19 Claims, 3 Drawing Sheets

(56) References Cited

U.S. PATENT DOCUMENTS

| | | | |
|---|---|---|---|
| 2004/0206610 A1* | 10/2004 | Hasegawa et al. | 200/10 |
| 2004/0227616 A1* | 11/2004 | Lafferty | 340/5.61 |
| 2006/0109085 A1 | 5/2006 | Tiernay et al. | |
| 2006/0253249 A1* | 11/2006 | Bruelle-Drews | 701/209 |
| 2006/0267736 A1 | 11/2006 | Tiernay et al. | |
| 2008/0218313 A1* | 9/2008 | d'Hont et al. | 340/10.1 |
| 2009/0243858 A1* | 10/2009 | Burnett et al. | 340/572.3 |
| 2012/0098439 A1* | 4/2012 | Recker et al. | 315/152 |

* cited by examiner

RFID TAG WITH OCCUPANCY STATUS RECALL

CROSS-REFERENCE TO RELATED APPLICATIONS

This utility application is a continuation-in-part of co-pending application U.S. Ser. No. 12/533,067 filed on Jul. 31, 2009, which claims benefit under 35 U.S.C §119(e) of Provisional Application Ser. No. 61/085,338, filed on Jul. 31, 2008. This application also claims the benefit under 35 U.S.C. §119(e) of Provisional Application Ser. No. 61/256,273 filed on Oct. 29, 2009 and entitled RFID Tag with Occupancy Status Recall. The entire disclosures of these three applications are incorporated by reference herein.

FIELD OF THE INVENTION

This invention relates generally to RFID transponder systems and more particularly to RFID transponders for use in electronic toll collection systems.

BACKGROUND OF THE INVENTION

In response to the inability of conventional toll collection means to meet the demands created by increased highway traffic, automated toll facilities that provide improved toll collection methods and systems have been proposed and are being implemented. These electronic toll collection systems eliminate the manual transactions of conventional toll collection means through the use of radio transmitters and receivers that perform the necessary transactions as a vehicle travels through the automated toll booth. For example, U.S. Pat. No. 7,224,291 (Hassett), which is assigned to the same assignee as this invention, discloses a system for automatic collection of tolls includes an in-vehicle toll processor (e.g., an RFID transponder or tag) having memory for storing a toll-money-available quantity purchased by the user, and a toll-facility-identification site that transmits a toll-facility-identifier signal indicating the identity of the upcoming toll facility. As the vehicle approaches the identification site, the in-vehicle processor receives the identifier signal and calculates the toll to be debited. When the vehicle passes through the toll facility, the in-vehicle processor transmits its identity, its net balance and the toll, which it debits from an account balance. The in-vehicle processor may increment a low balance, in which case it transmits information which is relayed to a central system for billing. Note that all references cited herein are incorporated by reference.

In some electronic toll collection applications, it would be desirable to vary the information transmitted by the RFID tag based on vehicle conditions. One example is a toll road with high occupancy toll (HOT/HOV) lanes. Highway administrations have created incentives for drivers to carpool by assigning differing toll amounts to single person vehicles versus multiple person vehicles and by allowing multiple person vehicles in lanes reserved for such vehicles. Presently, there are not available RFID tags for automated toll collection that provide for adjusting the data message sent by the tag. Therefore a need exists for a vehicle RFID tag that allows the driver to manually change the data sent by the tag to the toll system.

SUMMARY OF THE INVENTION

An RFID tag for installation in a vehicle for use in an electronic toll collecting system. The tag is capable of transmitting data to a tag interrogator indicating the occupancy status of the vehicle. In an embodiment, the tag has a user input and a visual and audible tag status indicator. The user input is used to change the occupancy status of the tag, wherein the occupancy status is a portion of a message sent by radio frequency to the interrogator when the vehicle passes through a toll area.

In an embodiment the tag has memory for storage of said tag status and the user input can be used to cause the tag to indicate a stored tag status. In a further embodiment, the tag reverts to a default status after a predetermined period of time.

Other advantages and novel features of the invention will become apparent to those skilled in the art upon examination of the following detailed description of a preferred embodiment of the invention and the accompanying drawings.

DESCRIPTION OF THE PREFERRED EMBODIMENT OF THE INVENTION

The invention relates to the concept of an RFID tag whose state can be changed by the driver or vehicle occupant to indicate an occupancy status. This is for use in High Occupancy Toll (HOT) systems where the toll charged is different depending upon occupancy.

The prior art is a system where the tag is in place when occupancy is single for example, so a toll is collected. When occupancy is more than one the tag is removed, or disabled, so that the tag is not read and not toll is collected. Other prior art is a switched transponder where the tag is turned on and off, similar to removing or disabling the tag.

The invention is useful for at least two reasons. First, it allows electronic toll collection with a vehicle tag that has more than two states so that authorities can more finely mange occupancy, for example they can charge no toll for HOV-3; a reduced toll for HOV-2, full toll for single occupant vehicles. Another aspect is that unlike current systems, which disable or turn off the tag for HOV's, in the inventive tag, the tag is not turned off, but its state is changed and a tag is read. This is helpful in implementation of enforcement systems as there is always a one to one match between vehicles and transponders.

Figure 1:
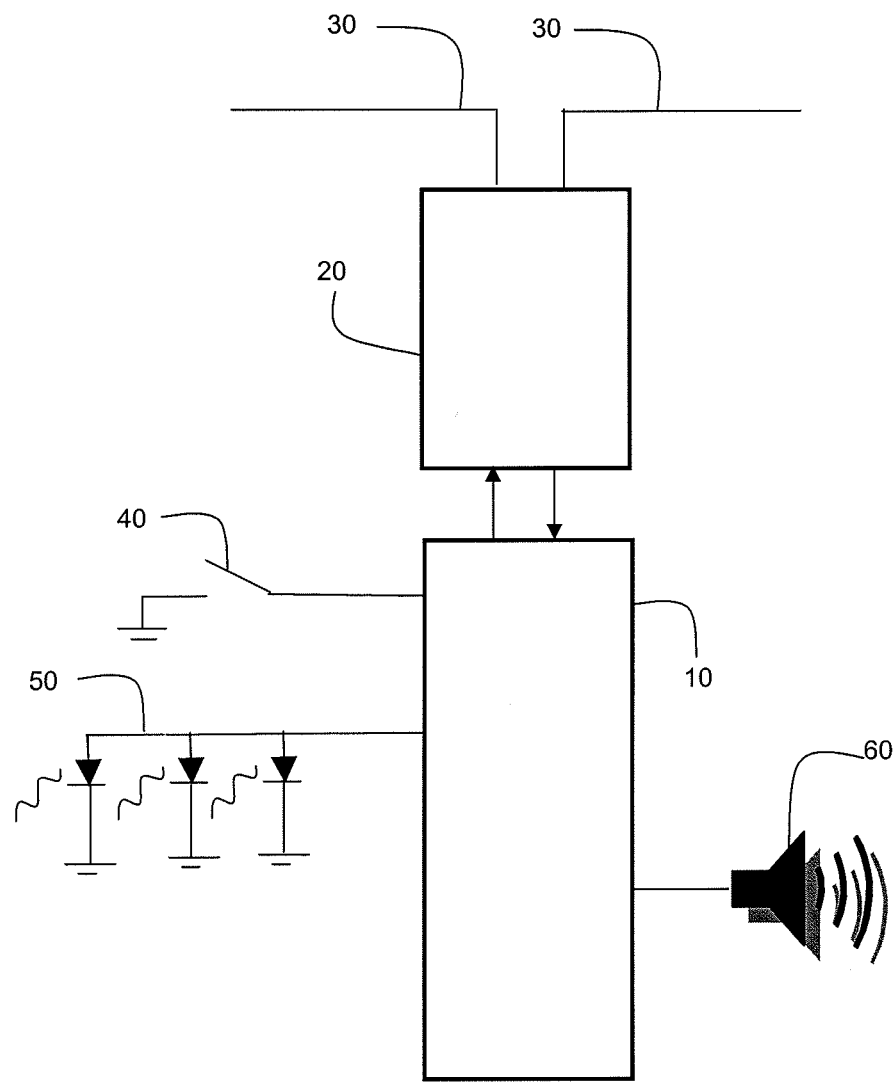
FIG. 1. is a block diagram of an embodiment of an RFID tag with manually adjustable data.

FIG. 1 shows an embodiment of a vehicle tag 100, which includes a processor 10, RF electronics 20, an antenna 30, a manual input momentary contact switch, 40 and a plurality of light emitting diodes, (LEDs) 50. One skilled in the art will understand the details of how the RF electronics sends and receives information to and from a tag interrogator, typically located at toll areas and how the RF electronics converts the RF signal received from the interrogator to digital data for the processor 10, and converts data from the processor 10 to and RF signal. The processor 10 may be a microprocessor that executes a program or it may be a more simple collection of digital logic elements that implements a state machine. In any event, the processor encodes information unique to the tag such that when the vehicle passes the tag interrogator at the toll area, the tag interrogator receives this data, identifies the vehicle and uses this information for billing the tag holder for the cost of the toll. Systems for performing the tag interrogation and billing functions are known in the art.

The tag 100 includes a momentary contact switch 40 that is accessible by the tag user. The switch 40 provides a user input to the processor that allows the user to change the state of the tag, including the information that the tag sends to the tag interrogator at the toll area.

In an embodiment, the tag is in a single occupant state when power to the tag is first applied. By pressing the switch 40, once, the tag confirms its single occupant status by lighting one of the LEDs 50. If the switch 40 is pressed a second time, within a short period of time, e.g. two seconds, the tag will go into two-occupant mode, and will display this by momentarily lighting two of the LEDs 50. If the switch 40 is pressed a third time, again within a short period of time from the second pressing, the tag will go into a three-or-more occupant mode, and signal this with a momentary lighting of three of the LEDs 50.

Figure 2:
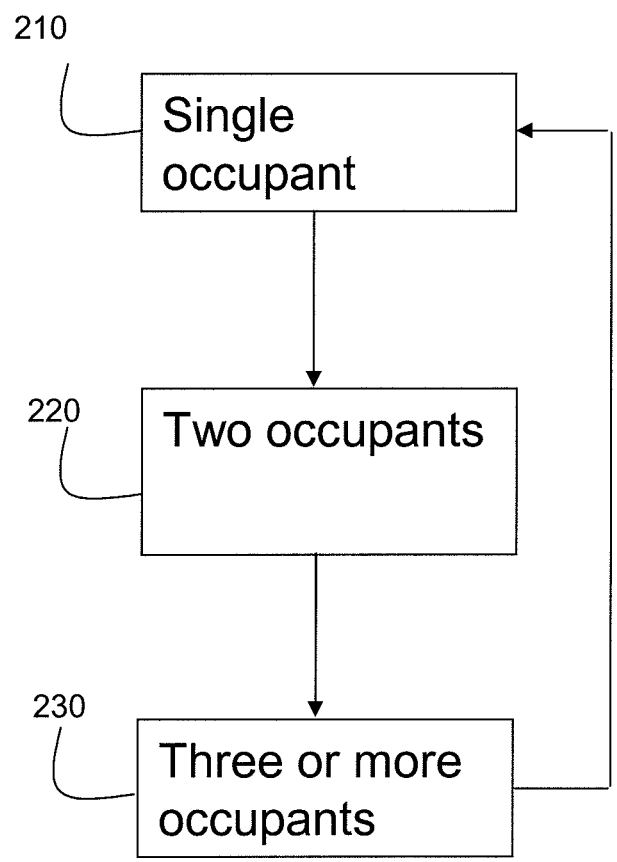
FIG. 2. is a flow diagram of occupant states of a vehicle RFID tag.

In an embodiment, there are three possible states as discussed above. A fourth pressing of the switch 40, within a short period of time would return the tag to the single occupant mode. The flow of these three modes is illustrated in FIG. 2, with single occupant mode 210, two occupant mode 220 and three-or-more occupant mode, 230.

In an embodiment, the LEDs 50 only remain illuminated for a short period of time after the user has set the occupancy level. Pressing the switch 40 after the LEDs 50 have gone off will cause the LEDs 50 to indicate the present occupancy state. Further presses of the switch 40 will cause the tag to advance to the next occupancy level, according to the chart in FIG. 2.

In a further embodiment, the LEDs also indicate other information about the tag when the occupancy mode is not being set. For example, the LEDs can indicate whether the tag is valid or has sufficient funds associated with it when the vehicle passes through the toll area and receives this information from the tag interrogator.

The embodiment shown in FIG. 1 also includes an audio output 60. The audio output tracks the indication of occupancy state as indicated by the LEDs. When one LED is lit, the audio output makes a single beep or buzz. When the state is two occupants, a double beep or buzz is made, and when the state is three-or-more occupants, three beeps or buzzes are activated. This allows the driver to change status without looking at the device. As is the case with the LEDs, the audio output 60 may indicate other information when the tag is not being set to an occupancy level. The audio output 60 may be a simple beeper or buzzer, or may be a speaker that produces fully formed words where the processor is capable of producing such a signal.

The embodiment described above is not intended to limit the invention. For example, the momentary switch 40 can be a capacitive switch, or can be a capacitive sensor that allows for finger position information to be read by the processor. Such a sensor would enable the user to set the occupancy mode by moving a finger along the sensor. Such sensors are well known in the art and implemented, for example in portable music playback devices. The input switch could also be a hall-effect device or magnetic reed switch such that a magnet could be used to open and close the switch. The input device could also be a photosensitive device such as a photodiode or photocell such that a light input could be used to open and close the switch. The user feedback mechanism is not limited to LEDs, but can also be Liquid Crystal Diodes, electro magnetic displays and the like. The invention is not limited to three occupancy states or three LEDS. For example, a fourth occupancy state would be a "bus" state for vehicles capable of carrying more than 6 passengers. The invention is not limited to the use of the ability to externally alter tag states for use in indicating vehicle occupancy status. For example, the tag state may be altered to indicate the type of vehicle for which it is being used. Or the tag state may be altered to indicate states of a variable toll rate where the user may be charged differing rates based on other factors such as how the toll fee is paid, how often the tag is used or whether the vehicle is being used for charitable or humanitarian purposes. Instead of multiple LED's or other visual indicators, a single device can be used and instead of the number of illuminated devices signaling a particular status, the single device is strobed on and off a number of times to indicate tag status.

Embodiments of tags having the features of the invention include some or all of the following features: a tag capable of use in multiple protocols, including Super eGo™, ATA and IAG modes; high speed, high performance suitable for high occupancy toll (HOT) and traffic management applications; tag operating status indicated by light emitting diodes (LEDs) and audio buzzer; read and write capability in any of the protocol modes it is useable with; enhanced data security with advanced anti-spoofing and anti-counterfeiting techniques; partitioned data fields for fixed factory and agency data; impact resistant, molded plastic cases available in multiple colors; non-replaceable internal battery with a ten year design life, based on typical usage; internal windshield mounting. Publications in the field of multiple protocol and multiple mode tags include: U.S. Pat. Nos. 7,548,153 and 7,016,311; and U.S. Application Pub. nos. 2006/0267736 and 2006/0109085. In the field of enhanced security features is U.S. Pat. No. 7,450,010.

Further embodiments include a high speed, high performance radio frequency identification (RFID) tag suitable for electronic toll collection and traffic management applications where driver feedback is specified. The tag is a read write on-board-unit ("OBU") that supports adding and editing data to the OBU at high speeds in real time. EZGo Anywhere Feedback OBUs are designed for high occupancy toll (HOT) applications and feature a push button that, when depressed, causes the OBU to transition from one operating state to another. LEDs, an audible buzzer or both will advise the driver of up to four statuses, for example, "single occupancy" vehicle, "double occupancy vehicle", "bus", etc. In normal road tolling applications, the LEDs and buzzer are used for driver feedback such as: valid tag; low balance; invalid tag and lost/stolen tag The eZGo Anywhere Feedback OBU enables advanced security techniques that ensure a tag's authenticity while preventing data corruption and/or alteration. In addition, tag cloning, spoofing, copying, or duplicating is prevented. All eZGo Anywhere OBUs support factory programming of fixed data fields that are locked at the factory and cannot be reprogrammed. Agency programmed fixed data fields can optionally be locked by the agency after programming using password protected programming equipment. eZGo Anywhere OBU cases are constructed of highly durable, impact resistant, molded plastic and are available in white, blue, orange, green, and yellow colors. Markings on the OBU assist patrons in the proper installation and orientation. Other multiprotocol eZGo Anywhere OBUs include: Standard Waterproof, and Exterior. The eZGo Anywhere Feedback OBU provides 3 light emitting diodes (LEDs) and an audible buzzer. When used in high occupancy toll (HOT) applications, the A/V indicators provide driver feedback as to the number of occupants in the vehicle. When used in normal road tolling applications, the A/V indicators provide driver feedback regarding account status.

Ability to Recover the Occupancy State as of the Last Read of the Tag

In a further embodiment, the tag provides the ability to recall the occupancy status of the tag as set at the last read of the tag. This feature is useful, for example, for law enforcement personnel to determine whether a driver has fraudulently claimed more occupants at a toll point than are in the vehicle.

When the tag is read by a reader, the occupancy state that of the tag is transferred to a separate memory location designated as the location for occupancy at the last read. This memory location is separate from the current declared occupancy status. When the push button 40 is continuously pressed for a given period of time (for example 4 s) the tag then responds with the number of beeps and or flashes that indicates the state upon last read held in this memory location This functionality is advantageous for enforcement in the system. If a police officer stops a vehicle for an apparent violation due to an occupancy indication that exceeds the actual vehicle occupancy, the police officer can verify the tag occupancy status at the last read location by holding down the button and observing the response. This eliminates some error claims that may be made by the driver. Embodiments of the system need not be limited to only the last read of the tag, but may comprise a history of several past reads. In this case continuous holding of the tag button 40 would cause the tag to flash out the last such status, followed by a pause, then flash out the second to last status, followed by a pause, and so on.

Automatic Reversion to Default State

Another functional enhancement of such a tag involves the implementation of a default state on the tag. In this approach, the tag occupancy status remains in a default state, for example, a status of single occupancy unless the user changes the status by moving it to another state. After a configurable period of time, the tag automatically reverts to the default occupancy state of the tag. Typically this time is chosen to encompass a single trip time, such that the user knows he will operate under the default occupancy status for a given trip unless he takes specific action to change the status.

This approach has several advantages. For example, the default status can be the single occupancy status, or the one with the highest toll. In this way the maximum toll is collected unless the user declares at the start of the trip that he is actually entitled to a discount due to a different status. This ensures maximum revenue for the authority and provides clarity of use for the driver. It also mitigates the potential for drivers to forget to change their occupancy status when appropriate form a lower toll rate to a higher rate, thus limiting the potential for drivers to get enforcement citations because "they forgot." Alternatively, the default status can be the most common occupancy status the user is expected to have such that the user only has to enter a different status when occupancy is different from the default, thus minimizing the amount of driver interaction.

This enhancement can be implemented in couple of different ways. One approach is to incorporate a timer or clock in the tag itself. When status is changed by the user, the clock or timer is used to time count the amount of time based on the tag configuration, after which the tag reverts the status to the default occupancy status. This approach however suffers from the disadvantage of requiring additional circuitry and power to run the clock or timer. While is viable, a preferred alternative embodiment consists of using time data obtained by the tag from the reader to determine whether a non-default occupancy status entered by the user has timed out or not and whether the tag should revert to the default status.

Figure 3:
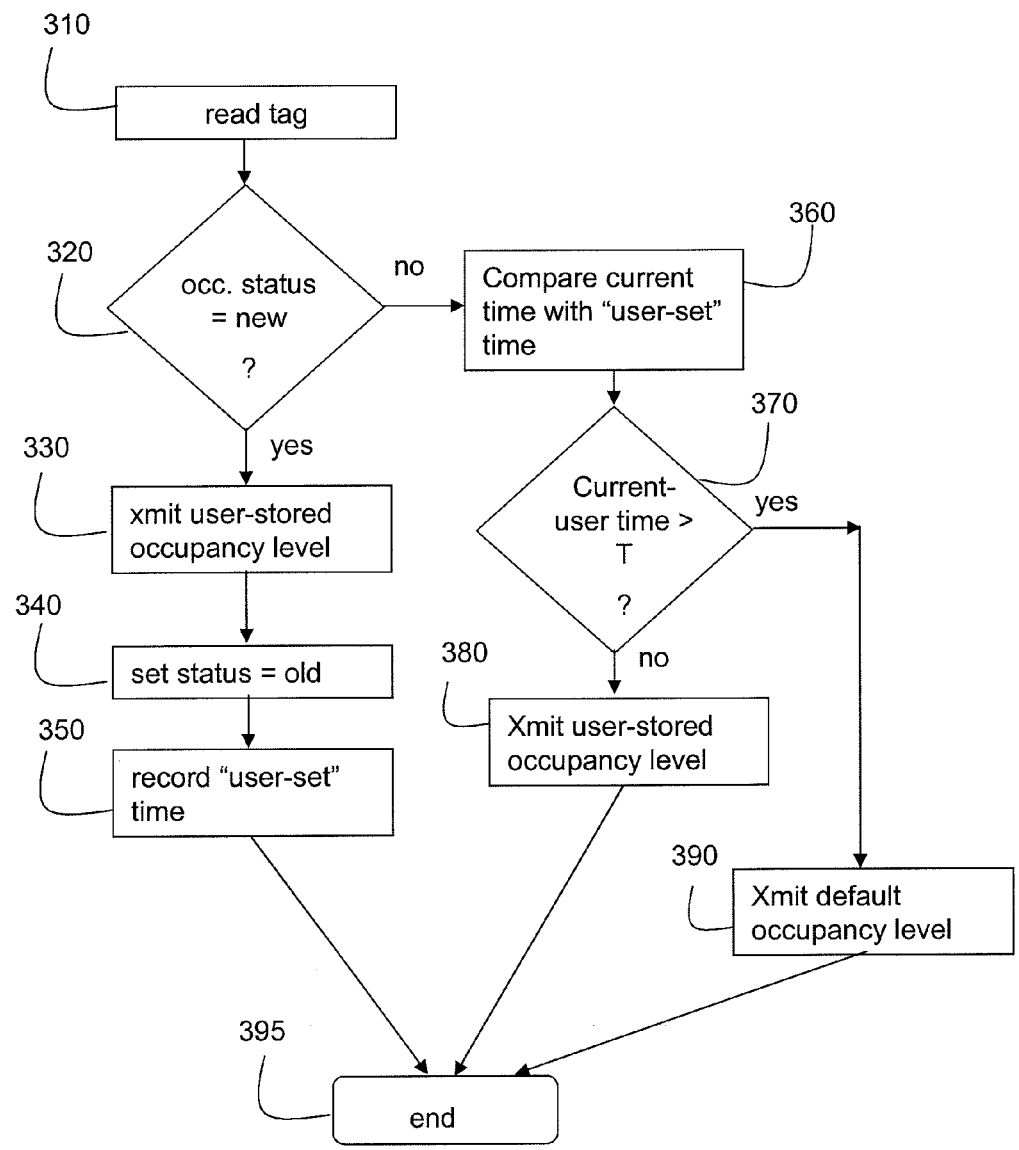
FIG. 3 is a flow diagram of an exemplary process for setting and resetting a user-modifiable tag status.

With reference to exemplary flow chart FIG. 3, in an embodiment of this type of implementation the system works as follows:

At the start of a trip, the user determines if his status is different from the default status. If it is not different, no action is required by the user. If it is different, the user enters a user-stored status and receives feedback confirmation. The tag then sets a "new status" flag, which means the tag status is newly entered since the tag was last read. When the tag is next read 310, the status flag is set to "old status" 340 indicating that the user-stored status of the tag has already been used on at least one trip. At every gantry location, date and time data is written into the memory of the tag as part of the transaction. At the start, this time and date are retained as the last read point time and date on the memory of the tag 350. When a tag is read at a subsequent location, the current time and date from the current reader is also sent to the tag and stored. The user-stored status is sent to the reader if the tag state is "new status" 330. If the tag state is "old status" (already been read once since the status was entered) then the current and previous date/times are compared 360, 370 and if the difference between them is less than a configurable time t, the tag sends to the reader the user-stored occupancy status 380. If it is more than or equal to time t, the tag sends the default status, 390 and resets the tag status to the default status. Time t is chosen to ensure that the entered status will allow the entered status to be used on a trip, but will time out before a typical second trip. Therefore any non-default status is intended to be entered on every trip where actual status is different from the default and is intended to be valid for a single trip only. Alternatively, the reader could determine the time difference t by reading the last read time from data stored in the tag and comparing this to its real time clock. The default status, entered status and the tag state could be determined either by reading data in the tag containing the status or from a local database in communication with the reader. In this case the reader (or another computer in communication with the reader) could then perform the logic above to determine if the default of current status should be used and reporting for toll charging purposes.

We claim:

1. An RFID tag comprising
   a user input and
   a visual tag status indicator
   wherein said user input changes status of the tag and said status is indicated by the tag status indicator when said status is changed, said status being a portion of a data signal sent to a tag interrogator when said tag is interrogated.

2. The RFID tag of claim 1, wherein the tag is a vehicle tag adapted for electronic toll collection.

3. The RFID tag of claim 2, wherein the tag status comprises a plurality of states related to the occupancy level of the vehicle.

4. The RFID tag of claim 3 wherein the tag status cycles through said plurality of states, one at a time, each time said user input is actuated.

5. The RFID tag of claim 1, wherein said visual tag status indicator is an LED.

6. The RFID tag of claim 1, further comprising an audible tag status indicator.

7. The RFID tag of claim 1, wherein said tag status is stored in an EEROM.

8. The RFID tag of claim 1, wherein said tag is a multi-protocol RFID tag.

9. The RFID tag of claim 1, further comprising a memory for storage of said tag status, wherein said user input is further adapted to cause the tag to indicate a previously stored tag status.

10. The RFID tag of claim 9, wherein the tag stores a plurality of previous status states and wherein said status states are recalled sequentially by actuating said user input in a manner that is different than is used to set tag status.

11. The RFID tag of claim 1, wherein said tag reverts to a default status after a predetermined period of time.

12. A method of operating an RFID tag having a tag status and a user input comprising:
    manually changing said tag status from default to user status using said user input;
    transmitting data including status indicating user status to a first RFID reader and recording a time stamp;
    interrogating the tag at a second RFID reader
    comparing current time at said second RFID reader with said time stamp and
    transmitting data from the RFID tag including status indicating user status if the difference between said current time and said time stamp is less than a predetermined threshold and transmitting data from the RFID tag including status indicating default status if the difference between said current time and said time stamp is greater than or equal to said predetermined threshold.

13. The method of claim 12 further comprising:
    resetting said tag status from user to default if the difference between said current time and said time stamp is greater than or equal to said predetermined threshold.

14. The method of claim 12 wherein said tag status is a vehicle occupancy status.

15. The method of claim 12 including changing said status from user status to default status after a predetermined period of time based on a clock in the RFID tag.

16. The method of claim 12 including changing said status from user status to default status after a predetermined period of time based on a stored time value and an external clock.

17. A method of operating an RFID tag having a user-settable status, a status indicator and a user input comprising:
    setting the user-settable status a first time with the user input;
    storing said status set the first time in a first memory location;
    setting the user-settable status a second time with the user input;
    storing said status set the second time in a second memory location;
    transmitting said status to a tag reader after at least one of said first or second setting; and
    recalling said first and second status settings sequentially and indicating said first and second status settings on the status indicator.

18. The method of claim 17, wherein said recalling step is activated by actuating said user input in a different manner than said user input is actuated to set the user status.

19. The method of claim 18, wherein said user input is a momentary contact switch and recalling step is activated by changing the state of said switch for a predetermined period of time.

* * * * *